United States Patent [19]

Kimura et al.

[11] 4,072,423
[45] Feb. 7, 1978

[54] LIGHT INTERFERENCE DEVICE WITH LOW DEGREE OF SPACIAL COHERENCE

[75] Inventors: Yoshiaki Kimura, Hachioji; Hiroshi Ito, Inagi, both of Japan

[73] Assignee: Konishiroku Photo Industry Co., Ltd., Tokyo, Japan

[21] Appl. No.: 649,847

[22] Filed: Jan. 16, 1976

[30] Foreign Application Priority Data

Jan. 21, 1975 Japan .................................. 50-9402

[51] Int. Cl.² .............................................. G01B 9/02
[52] U.S. Cl. ..................................... 356/109; 356/108
[58] Field of Search ................ 356/108, 109, 113, 112

[56] References Cited

U.S. PATENT DOCUMENTS

| | | | |
|---|---|---|---|
| 2,518,647 | 8/1950 | Teeple et al. | 356/108 |
| 3,941,456 | 3/1976 | Schilz et al. | 350/188 |

OTHER PUBLICATIONS

"Interference Methods & Instruments for Inspecting Optical Flats," I. I. Dukhopel, Sov. Jour. of Opt. Tech., vol. 38, No. 9, 1971, pp. 570–578.

Primak; William, The Determination of the Absolute Contours of Optical Flats, Applied Optics, Nov. 1967, p. 1917.

Peters & Boyd, The Calibration & Dimensional Changes of Precision Gage Blocks, American Machinist, vol. 53, No. 14, p. 627.

Bruce & Sharples, Relative Flatness Measurement of Uncoated Optical Flats, Applied Optics, vol. 14, No. 12, 12/75.

*Primary Examiner*—Conrad J. Clark
*Attorney, Agent, or Firm*—James E. Nilles

[57] ABSTRACT

A light interference device comprising a light source having a low degree of spacial coherence, an optical element having a reference surface for interference, an optical system for providing a parallel light bundle, and an optical projection system for projecting interference fringes localized near the interference surface.

Said parallel light bundle comes out of the reference surface at an angle $\theta$ within the range of $0° < \theta \leq 30°$.

6 Claims, 4 Drawing Figures

LIGHT INTERFERENCE DEVICE WITH LOW DEGREE OF SPACIAL COHERENCE

The present invention relates to an improvement of a light interference device, more particularly a light interference device for measuring the flatness of a relatively thin transparent material.

For a long time there has been used the method of measuring flatness of a material which utilizes light interference phenomenon. This method has such merits as set forth below:

a. Measurement of high accuracy can be attained;

b. The accuracy of measurement is hardly influenced by atmospheric factors such as temperature and humidity;

c. Measurement can be attained without contacting with the material; and d. Since measurement is performed in two dimensions, the time period spent in measurement is shorter than the other measuring methods.

The measuring sensitivity $\alpha$ attained by the light interference device of this type is defined as representing a difference between the distances of two optional points, which are located on the surface of a material to be measured and correspond to two black lines of equally thick interference fringes adjacent with each other, from an interference reference surface. The sensitivity $\alpha$ can be expressed as a function of the angle $\theta$ at which a light bundle comes out of the interference reference surface and be generally formulated as an equation I (refer to FIG. 1 in which symbol $a$ represents the interference reference surface, $b$ a surface of the material of which flatness is measured and $c$ the light bundle).

$$\alpha = \lambda/2\, n_0 \cos \theta \qquad \text{I}$$

wherein symbol $\lambda$ denotes a wave length of the light beam used and $n_0$ the refractive index of a medium present between the interference reference surface and the surface of the material, said medium generally being air and $n_0$ being equal to 1.

Usual light interference devices are the optical flat, Fizeau type or the like wherein it is provided that $\theta = 0$ and that $n_0 = 1$ and it can be said that the highest sensitivity is attained in these types. However, when it is tried to measure the flatness of a transparent material being relatively thin and having substantially parallel surfaces, such for example as a glass plate, by means of the one of usual light interference devices, for example the one of Fizeau type, the interference fringes are generated between two sides of the transparent material as well as the ones generated between the interference reference surface and the surface of the material. The former interference fringes are noise, thus causing measurement to be extremely difficult.

An object of the present invention is to provide a light interference device capable of attaining measurement of high sensitivity and low noises even in the case of measuring the flatness of a transparent material being relatively thin and having substantially parallel surfaces. The characteristics of the light interference device according to the present invention reside in that a light source of low degree of spacial coherence is used as an interference light source, that the light bundle coming from the light source is arranged to come out of an interference reference surface at an angle $\theta$ ranging $0° < \theta \leq 30°$ and that the interference fringes localized near the interference reference surface are projected through an optical projection system onto a surface to be viewed.

The present invention makes it essential to set the angle $\theta$ at which the light bundle comes out of the interference reference surface in the range of $0° < \theta \leq 30°$ and there will be described the meaning of it.

As shown in FIG. 2, a relatively thin transparent material $e$, the thickness of which is $d_2$, is located with a distance $d_1$ from an interference reference surface $f$ and the light bundle having a wave length $\lambda$ is arranged to come out of the reference surface $f$ at an angle $\theta'$. Measurement of flatness is carried out utilizing light interference between the surface $g$ of the material, the flatness of which is measured, and the reference surface $f$ and this phenomenon is expressed by the state under which a light bundle A overlapps a light bundle B at a point P in FIG. 2.

The distance $\delta_{AB}$ between the light bundles A and B at this time can be formulated as an equation II.

$$\delta_{AB} = 2d_1 \cdot \tan \theta \cdot \cos \theta' \qquad \text{II}$$

$$= 2d_1 \cdot \tan \theta \cdot \sqrt{1 - \left(\frac{n_0}{n_1}\right)^2 \cdot \sin^2\theta}$$

wherein $n_1$ is the refractive index of the material providing the reference surface.

The interference fringes providing noises at the time of measurement, for example the ones caused by the back face $h$ opposing against the surface of the material, the flatness of which is measured, and the reference surface $f$ are caused by the overlapping of the light bundle A upon a light bundle C at a point Q in FIG. 2. The distance $\delta_{AC}$ between the light bundles A and C can be formulated as an equation III, similarly in the case of the equation II.

$$\delta_{AC} = \delta_{AB} + 2d_2 \cdot \frac{\frac{n_0}{n_2} \sin \theta}{\sqrt{1 - \left(\frac{n_0}{n_2}\right)^2 \sin^2\theta}} \cdot \cos \theta \qquad \text{III}$$

Then, provided that $\theta = 0$, $$\delta_{AB} = \delta_{AC} = 0 \qquad \text{IV}$$

Namely, in the case of $\theta = 0$, the interference fringes come to appear even if a light source of low degree of spacial coherence is used, but the visibility of the interference fringes generated between the reference surface $f$ and the surface $g$ of the material, the flatness of which is measured, that is, the interference between the light bundles A and B is same as that of the interference fringes generated between the interference surface $f$ and the back face $h$ of the transparent material $e$, that is, the interference between the light bundles A and C, thus causing measurement to be impossible.

Therefore, there must be provided a difference between $\delta_{AB}$ and $\delta_{AC}$. Namely, only when a difference is provided between $\delta_{AB}$ and $\delta_{AC}$, the visibility of the former interference fringes becomes different from that of the latter ones. This is because it must be provided that $\theta \neq 0$ to result $\delta_{AB} \neq \delta_{AC}$.

However, this causes a problem. Because, provided that $\theta \neq 0$, namely, the light bundle of oblique incidence be used, measuring sensitivity will be degraded. Thus, high measuring sensitivity has not been attained by conventional light interference methods using only obliquely incident light.

Degradation of sensitivity will be demonstrated as shown in a Table below in the case of $\theta \neq 0$.

Table

| $\theta$ (degree) | $\beta$ |
|---|---|
| 5 | 1.0038 |
| 10 | 1.0154 |
| 15 | 1.0352 |
| 20 | 1.0641 |
| 25 | 1.1033 |
| 30 | 1.1547 |
| 40 | 1.3054 |
| 50 | 1.5557 |
| 60 | 2.0000 |
| 70 | 2.9238 |
| 80 | 5.7587 |

$\beta$ is such a value as obtained from an equation V and therefore, the equation I can be converted to an equation VI using $\beta$.

$$\beta = \frac{1}{\cos \theta} \quad \text{V}$$

$$\alpha = \frac{\lambda}{2n_0} \cdot \beta \quad \text{VI}$$

It will be understood from the above that sensitivity is degraded only by 15 percent and kept in such high level as attained by the light interference method, for example Fizeau type, when $\theta$ is selected to be in the range of $0° < \theta \leq 30°$.

There will now be described the relation between the light source used in the light interference device and $\theta$. When a light source of high degree of spacial coherence, for example a laser beam is used, the interference fringes are not localized and can be viewed in any position very clearly even if it is provided that $\theta \neq 0$, more particularly $\theta$ is a very large value. However, when such light source of high degree of spacial coherence is used, the interference fringes providing noises are neither localized and can be viewed very clearly, too.

To the contrary, when a light source of low degree of spacial coherence is used under the condition that $\theta \neq 0$, it is possible to provide such a state that only the interference fringes generated between the reference surface and the surface of the material to be measured, these interference fringes being necessary for measuring, are viewed very clearly while the other interference fringes providing noises are limited in their visibility. As already stated, when it is provided in this case that $\theta = 0$, the visibility of the interference fringes providing noises is same as that of the ones necessary for measuring.

But in this case the area in which the interference fringes can be observed is localized near the reference surface. Namely, the interference fringes are localized near the interference surface. Accordingly, the interference fringes cannot be viewed in this case unless the surface to be viewed is located to this localized position. However, practically speaking, when the observing surface is located at the side of the reference surface, the light bundle incoming to the reference surface will be hindered and when the surface to be viewed is located at the side of the surface to be measured, exchange of the material to be measured will become impossible, thus causing it to be impossible that the surface to be viewed is located to the above-mentioned position.

The present invention has solved this problem by that the image on the reference surface is made on the surface to be viewed using an optical projection system and that a space equivalent to the space which is occupied by the reference surface is provided near the surface to be viewed. Namely, using the optical projection system, the present invention makes it possible to locate the surface to be viewed to any optional position.

The light interference device according to the present invention allows measurement of the flatness of a material to be attained with high accuracy and low noises even if the material, the flatness of which is measured, is thin, transparent and of good parallel property, thus bringing an extremely great effect to the measurement.

Other objects and merits of the present invention will be apparent from the following detailed description with reference to the accompanying drawing; in which FIG. 1 is a view to explain the conventional light interference techniques;

Figure 1:
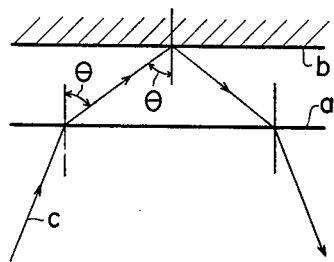
Figure 2:
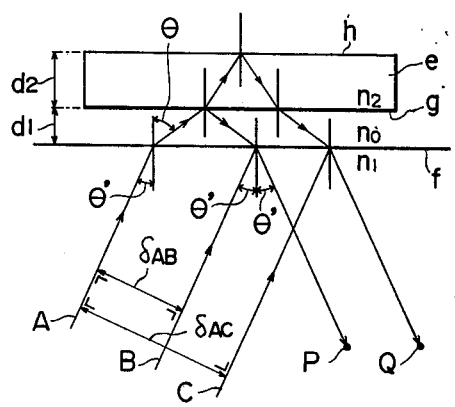
FIG. 2 is a view to explain the principle of the present invention.
Figure 3:
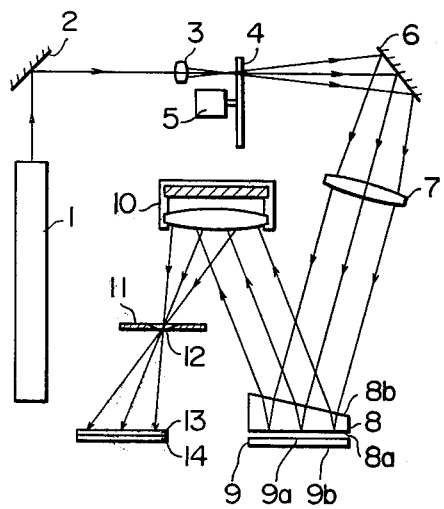
FIG. 3 is a view showing the light passage in an embodiment according to the present invention.

In FIG. 3 numeral 1 represents a laser beam source, 2 a reflector, 3 a condenser, 4 a rotary diffusing plate driven by a motor 5 near the focusing point of the condenser 3, 6 a reflector, and 7 a collimator lens for producing a parallel light bundle; 8 a light interference gauge, the one side of which acts as a reference surface 8a and the other side 8b thereof is inclined at a predetermined angle relative to the reference surface 8a; 9 a material of transparent plate to be measured, the surface of which to be measured is denoted by numeral 9a and the back face of which is denoted by 9b; 10 an inmirror lens system, which acts as an optical projection system, comprising a lens and a mirror; 11 a mask provided with a minute aperture 12, said mask being located to a position in which a group of parallel light bundles coming out of the light interference gauge 8 is focused through the inmirror lens system 10; 13 a diffusing screen which functions as a surface to be viewed; and 14 a Fresnel lens for enabling the most bright image to be made on the screen.

The collimator lens 7, the reference surface 8a, the inmirror lens system 10 and the diffusing screen 13 are selected with one another to locate in such positions as shown in FIG. 3 to make it possible that an angle is provided between the light path through which a group of parallel light bundles comes to the inclined surface 8b of the light interference gauge 8 and the one through which a group of parallel light bundles comes out of said inclined surface; that the angle $\theta$ at which the group of parallel light bundles is reflected by the reference surface 8a meets the condition as mentioned above; and that both of the reference surface 8a and the diffusing screen 13 are on a same plane to have a conjugate relation to the inmirror lens system, respectively.

The light radiated from the laser beam source 1 and having a high degree of spacial coherence is reflected by the reflector 2 to come into the condenser 3. The laser beam passed through the condenser 3 is once focused and then reaches the rotary diffusing plate 4, by which the beam is scattered to form a secondary light source.

This secondary light source acts as a light source whose space coherence is degraded and the degree of degradation is determined by both of the property of the rotary diffusing plate 4 and the distance between the focusing point and the diffusing surface. The laser beam from the secondary light source is reflected by the reflector 6 in a predetermined direction, converted through the collimator lens 7 to a parallel light bundle and comes into the light interference gauge 8. This light-flux is reflected by the reference surface 8a at the angle $\theta$ which is selected to be in the range of $0° < \theta \leq 30°$ as stated above.

The light bundle reflected by the reference surface 8a and the one reflected by the surface 9a of the material to be measured are interfering with each other to come into the inmirror lens system 10 which functions as the optical projection system. The light bundle coming into the lens system 10, said light bundle being not a usual one but a group of fine rays of light coming out of interfering points, is once focused to pass through the minute aperture 12 of the mask 11 and then reaches the diffusing screen 13 of transmission type to make interference fringes thereon. It will be apparent from the reason as already stated that the interference fringes appeared on the diffusing screen 13 can be viewed as a clear pattern of low noises.

FIG. 3 only shows an embodiment of the present invention and it goes without saying that the present invention is not limited to the embodiment as shown in FIG. 3 and that various modifications can be made to the present invention. For example, a combination of a laser and a liquid crystal may be used as the light source to obtain a secondary light source of low degree of spacial coherence. Or a mercury-arc lamp, a monochromatic lamp or the like, which has essentially a low degree of spacial coherence, may be also used.

The optical projection system may be a usual lens system forming a linear light path or the one using a concave mirror.

The surface to be viewed may be a reflecting screen or may be arranged that electronic viewing can be attained using an image tube (vidicon).

Figure 4:
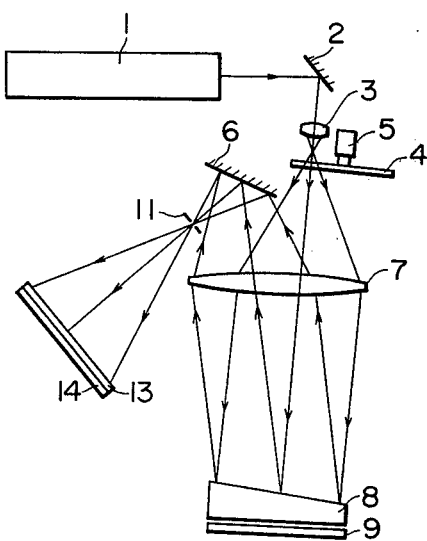
FIG. 4 is a view showing the light passage in another embodiment according to the present invention.

As shown in FIG. 4 in which same reference numerals are used to same members as those in FIG. 3, the collimator lens may be functioned as a lens for the optical projection system.

Finally, there will be described the relation between the inclined surface 8b and the mask 11.

As shown in FIGS. 3 and 4, the light bundle carrying the interference fringes (normal light bundle) come out of the optical gauge 8. Moreover, a light bundle reflected by the inclined surface 8b and a light bundle multiply reflected between the inclined surface 8b and the reference surface 8a also come out of the optical gauge 8. However, the lights (noise light) reflected by the reference surface 8b and multiply reflected between the inclined surface 8b and the reference surface 8a go toward a different direction from that of the normal light bundle because of the trapezoid form of the optical gauge. Therefore, if the normal light bundle and the noise lights are focused by the projection optical system, the noise lights are focused at a position different from that of the normal light bundle.

By positioning the mask 11 having the minute aperture 12 so that the aperture allows only the normal light bundle to pass therethrough, the noise lights are omitted. Thereby, the clear interference fringes are projected on the diffusing screen 13.

What is claimed is:

1. A light interference device for measuring the flatness of a surface to be measured, said surface to be measured being one side of a plate of transparent material having a back face, said device comprising a light source, an optical element having a reference surface for interference upon which a parallel light bundle from the light source impinges and passes through and from which a parallel light bundle is reflected, said reference surface being locatable adjacent but spaced from said surface to be measured whereby interference fringes are generated as a result of the interaction of light rays reflected from said reference surface and from said surface to be measured, said light source having a low degree of spatial coherence whereby said interference fringes are localized near said interference surface, an optical system between said light source and said reference surface for providing a parallel light bundle coming out from said reference surface toward said surface to be measured at an angle $\theta$ within the range of $0° < \theta \leq 30°$, an observing surface, and an optical projection system for projecting interference fringes localized near said interference surface onto said observing surface.

2. A light interference device according to claim 1, wherein said light source comprises a laser, a condenser for focusing the laser beam from the laser and a rotary diffusing plate located near the focusing point of the condenser.

3. A light interference device according to claim 1, wherein said optical system comprises a collimator lens for converting a light bundle from said light source to a parallel light bundle.

4. A light interference device according to claim 1, wherein said optical element is a glass block having the reference surface and a surface inclinedly opposing to said reference surface.

5. A light interference device according to claim 1, wherein said optical projection system includes an optical member comprising a lens and a mirror, and a mask provided with a minute aperture and located at the focusing point provided by the inmirror optical system.

6. A light interference device according to claim 2, wherein said optical projection system includes a collimator lens and a mask provided with a minute aperture and located at the focusing point provided by the collimator lens.

* * * * *